United States Patent [19]

Bareis

[11] Patent Number: 5,617,407
[45] Date of Patent: Apr. 1, 1997

[54] OPTICAL DISK HAVING SPEECH RECOGNITION TEMPLATES FOR INFORMATION ACCESS

[76] Inventor: Monica M. Bareis, 2240 Tarpley Rd, #213, Carrollton, Tex. 75006

[21] Appl. No.: 717,185

[22] Filed: Sep. 20, 1996

Related U.S. Application Data

[63] Continuation of Ser. No. 492,971, Jun. 21, 1995, abandoned.
[51] Int. Cl.⁶ .................................................. G11B 7/00
[52] U.S. Cl. ........................... 369/275.3; 369/58; 369/32; 360/53
[58] Field of Search .................................. 369/50, 47, 48, 369/49, 53, 54, 58, 59, 60, 124, 32, 275.3; 360/48, 53; 379/89, 197, 198

[56] References Cited

U.S. PATENT DOCUMENTS 4,757,525  7/1988  Matthews et al. ........................ 379/89
5,446,714  8/1995  Yoshio et al. ........................... 369/58 X

*Primary Examiner*—Muhammad N. Edun
*Attorney, Agent, or Firm*—Martin Korn

[57] ABSTRACT

A storage medium comprises a storage area which stores digital picture and/or audio information includes a plurality of image and/or sound information and a digital contents information table including a plurality of digital contents information which are related to the contents of said plurality of image and/or sound information. The digital contents information table of the storage area being divided into a plurality of sections providing speech recognition templates and other information by which the disk may be accessed, contents of the disk may be accessed, and information capable of outputting or displaying selected information, the selected disk, or contents thereof.

12 Claims, 5 Drawing Sheets

OPTICAL DISK HAVING SPEECH RECOGNITION TEMPLATES FOR INFORMATION ACCESS

This application is a continuation of application Ser. No. 08/492,971, filed Jun. 21, 1995 now abandoned.

TECHNICAL FIELD OF THE INVENTION

The present invention relates generally to information storage mediums, and more particularly, to optical information storage mediums suitable for CD-ROM players, CD-ROM encyclopedia systems, CD-ROM map and navigation systems, optical disk video systems, computers with optical disk systems, or other systems implementing optical disks and which respond to spoken commands to perform control and/or information access functions.

BACKGROUND OF THE INVENTION

All present day optical disks used for CD-ROM, miniature ROM disk, video ROM disk, or other systems implementing optical disks require the use of push buttons or switches to perform control, library selection, or other information access functions. Push buttons as well as switches are comprised of mechanical contacts and are therefore subject to failure from metal fatigue, corrosion of the electrical contacting surfaces, and dirt buildup. For singular disk and especially for multiple disk systems, push buttons on the control apparatus, though allowing for programmable functions, do not provide a user friendly mechanism to change or access, for example, songs, videos, maps, or multimedia library information. Additionally, present day systems have no method for fast and simple access to all optical disk information through either an accompanying remote apparatus or on the system itself. Present day systems require the user to have specific knowledge of the location of the optical disk in the system as well as the location of the song, video, map, multimedia library, or other data stored on the optical disk. Automatic speech recognition technologies can provide solutions by alleviating the requirement for numerous mechanical switches and by allowing for direct information access through a more user friendly human interface; spoken words can be used to access corresponding information on optical disks.

In the automotive environment, automatic speech recognition technology can also play a crucial safety role. The user is no longer required to take his eyes off of the road to make song selections, access map information, or the like. For example, to access a song on a CD-ROM player, all the user would be required to do is to simply speak the name of the song that he wants to listen to.

Whether in a mobile environment or a home system, the lack of fast and simple access can be especially frustrating when using multiple optical disk platforms. For example, the trend for multiple CD platforms has been to accommodate increasing numbers of CDs. Today, some systems have as many as one hundred CDs or more and all systems require the user to have a knowledge of what CD-ROM disk the information is located on, where that particular CD-ROM disk is placed in the system, and where on the CD-ROM disk that the information is located. An enhancement for present optical disk systems is to use automatic speech recognition technology to overcome the disadvantages associated with the use of push buttons for accessing optical disk information. Present day CD-ROM disks do not have speech recognition templates. These templates are required for allowing the user immediate access to all disk information by simply speaking the title or a word representing the information to be selected.

A need has thus arisen for an optical disk access system that overcomes the disadvantages and inefficiencies associated with existing optical disks by providing automatic speech recognition templates as well as stored response messages on disk to allow for a more user friendly interface on systems that make use of this technology.

SUMMARY OF THE INVENTION

The present invention overcomes the disadvantages and inefficiencies associated with using existing CD-ROM or other optical disk technologies by allowing for a more efficient user interface for system control. The preferred user interface is accomplished by integrating automatic speech recognition technologies into optical disk players for command and control purposes. The use of automatic speech recognition technologies in conjunction with optical disks provides an information or data storage medium capable of supplying reference templates for speech to enable users to access specific disks and/or disk information by speaking associated words, titles, or the like. The present invention provides for an optical disk capable of automatic speech recognition command and control that can present or output previously stored information for the purpose of indicating user selections.

In accordance with one aspect of the present invention, there is provided an information storage medium comprising a storage area which stores digital picture and/or audio information including a plurality of image and/or sound information and a digital contents information table including a plurality of digital contents information which are related to the contents of the plurality of image and/or sound information. The digital contents information table of the storage area is divided into a plurality of sections providing speech recognition templates and other information by which the disk may be accessed, contents of the disk may be accessed, and information capable of outputting or displaying selected information, the selected disk, or contents thereof.

In accordance with another aspect of the present invention, there is provided an information storage medium comprising a storage area which stores digital picture and/or audio information including a plurality of image and/or sound information and a plurality of associated digital contents information bins including digital contents information which are related to the contents of the plurality of image and sound information. Each of the digital contents information bins of the storage area is appended to each one of the respective sections comprising image and/or sound information. The digital contents information tables further include speech recognition templates and other information by which contents of the disk may be accessed, and information capable of outputting or displaying selected information or contents thereof. The disk title, disk selection marker, and whole disk information as well as associated speech templates and output information may be accessed through information contained in a separate digital contents information area. Additionally, the information storage medium may include an optical storage disk implementing digital data compression and/or decompression techniques such as Adaptive Differential Pulse Code Modulation (hereinafter referred to as ADPCM) or the like.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1A:
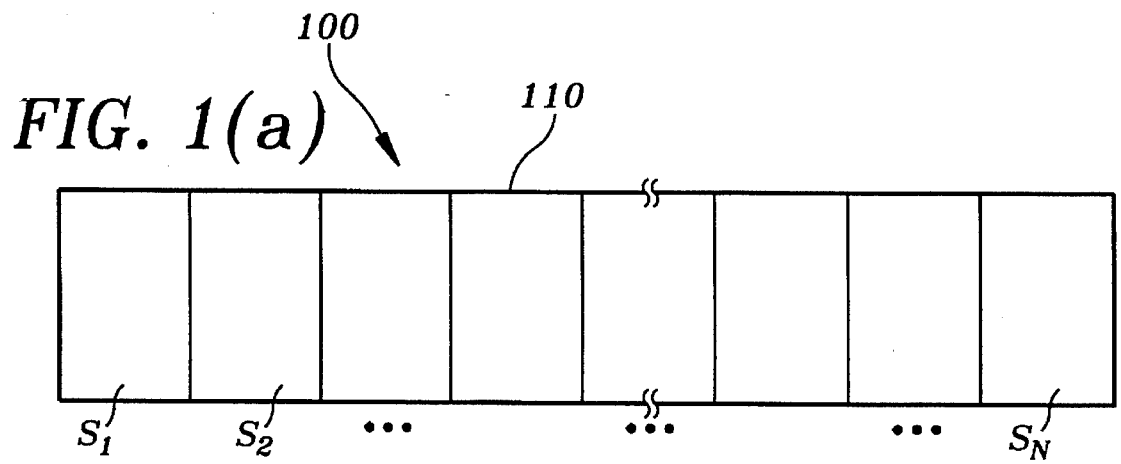
FIGS. 1(a) through 1(c) are diagrams illustrating a first embodiment of the present invention.
Figure 1B:
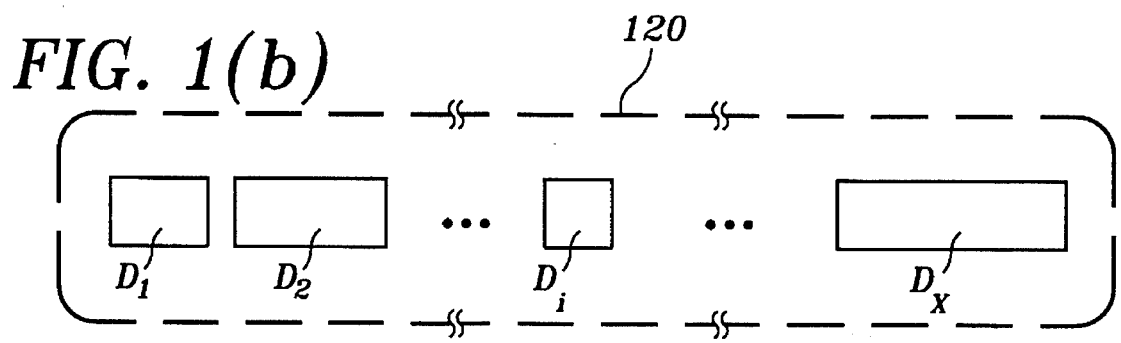
Figure 1C:
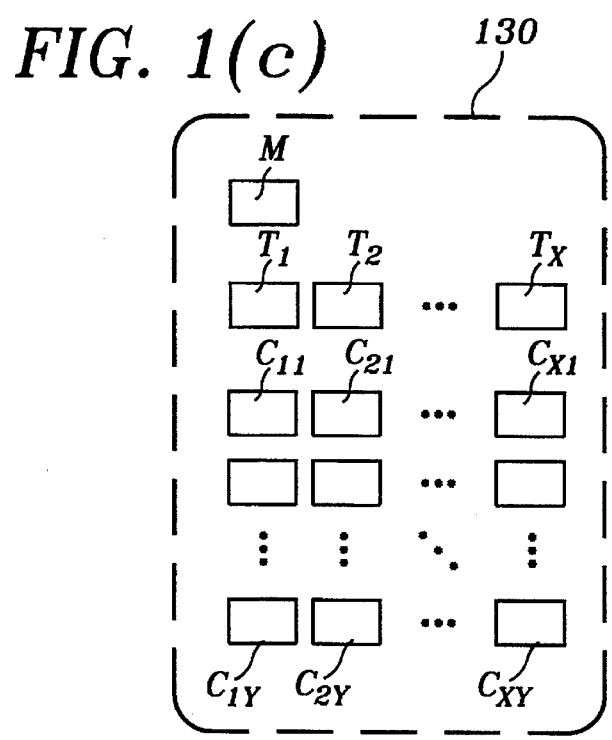

FIGS. 1(a), 1(b), and 1(c) schematically illustrate a first embodiment of the present invention. FIG. 1(a) shows an optical information storage medium 100. The optical information storage medium 100 has an associated storage area 110. The storage area 110 contains sections $S_1$ through $S_N$. One group of sections $S_1$ through $S_N$ stores a digital contents information table 130 (FIG. 1(c)) including a disk selection marker M and automatic speech recognition templates $T_1$ through $T_X$. Another group of sections $S_1$ through $S_N$ stores digital audio, picture, text, or other digital information 120. The digital information 120 contains data $D_1$ through $D_X$ which may be comprised of musical pieces, image information, text, binary data, map information, or the like (FIG. 1(b)).

The digital contents information table 130 contains a disk selection marker M, digital contents information $C_{11}$ through $C_{XY}$, and speech templates $T_1$ through $T_X$, which are related to the digital data $D_1$ through $D_X$ as shown in FIG. 1(c). The addressing pointers in the digital contents information $C_{11}$ through $C_{XY}$ are used to access the desired digital data $D_1$ through $D_X$. The disk selection marker M includes speech templates and/or title information used for selection of a specific disk in a multiple disk system.

When the information storage medium 100 shown in FIG. 1(a) is played back on an associated disk player to reproduce the digital contents information table 130, the disk selection marker M, speech templates $T_1$ through $T_X$, and the digital contents information $C_{11}$ through $C_{XY}$ relative to the digital data $D_1$ through $D_X$ contained in the digital information area 120 are reproduced. The template contained in the disk selection marker M and/or templates $T_1$ through $T_X$ contained in the digital contents information table 130 are extracted and used for comparison with human speech patterns to determine which disk is to be selected and which information on the disk is to be accessed.

For example, the digital contents information table 130 contains speech templates $T_1$ through $T_X$ which represent titles of music piece information stored as digital data $D_1$ through $D_X$ respectively in the information area 120. When the title of a music piece is spoken, the speech recognition processing unit of the disc player compares the spoken title to speech templates $T_1$ through $T_X$ stored on the optical disk and if the corresponding music piece $D_1$ through $D_X$ is found, the music piece will be selected by the disk player and played back.

Additionally, the digital contents information $C_{1j}$ through $C_{Xj}$ may include response messages to indicate which music piece was selected. Response messages may consist of played prerecorded speech, electronically generated verbal announcements, and/or text or graphical data that can be shown on a system display. FIG. 1(c) depicts one version of the ordering of the digital contents information $C_{1j}$ through $C_{Xj}$, speech templates $T_1$ through $T_X$, and the disk selection marker M; other orderings and/or combinations of these may also be used.

Because the digital contents information $C_{1j}$ and $C_{Xj}$ is composed of digital data, the data can include text in any language which may be shown on a graphical display or the like. Also, because the digital contents information $C_{1j}$ through $C_{Xj}$ is digital, it can contain prerecorded messages in any language which may be played out through an audio transducer such as an electronic speaker or the like. A list of music piece title choices representing music piece information stored as digital data $D_1$ through $D_X$ can be displayed and/or presented verbally through an electronic speaker in response to a spoken command such as "LIST CONTENTS." Therefore, the user can output and display text and/or have presented verbal representations of music piece titles from the information storage medium 100, and play back a desired music piece based on speaking a title from the displayed and/or verbally presented title representations listed.

Figure 2A:
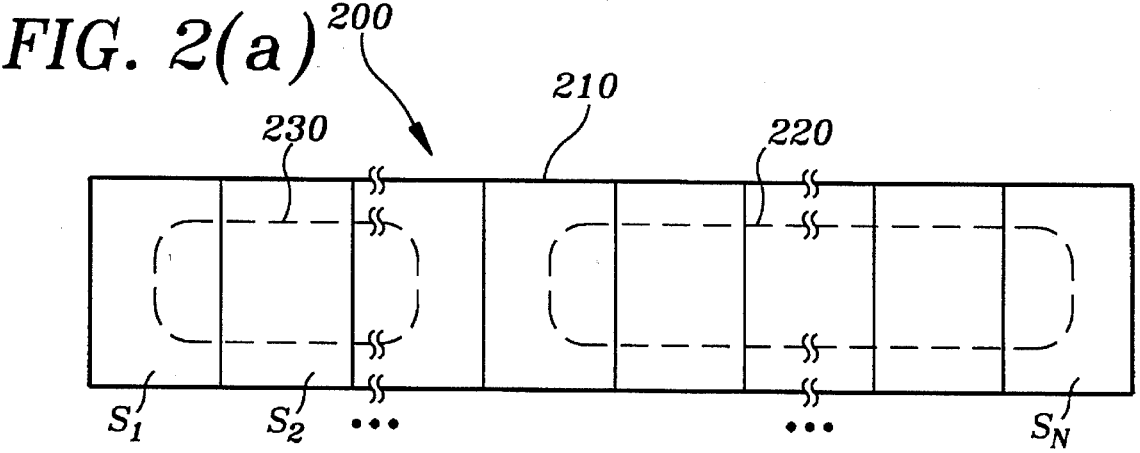
FIGS. 2(a) through 2(c) are diagrams illustrating a second embodiment of the present invention.
Figure 2B:
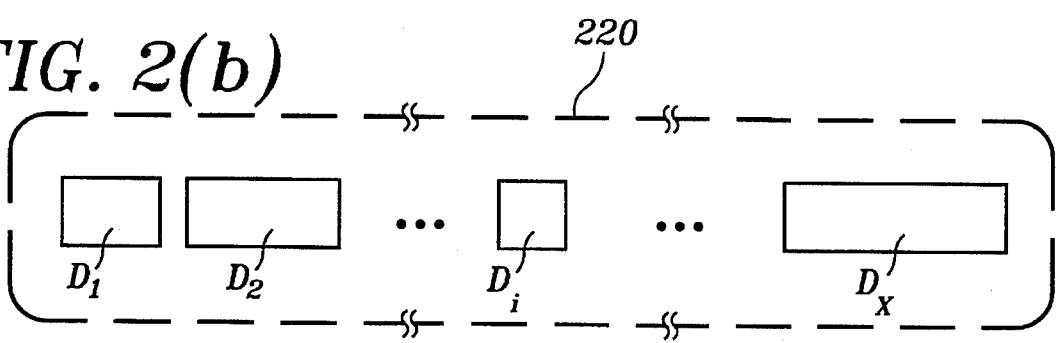
Figure 2C:
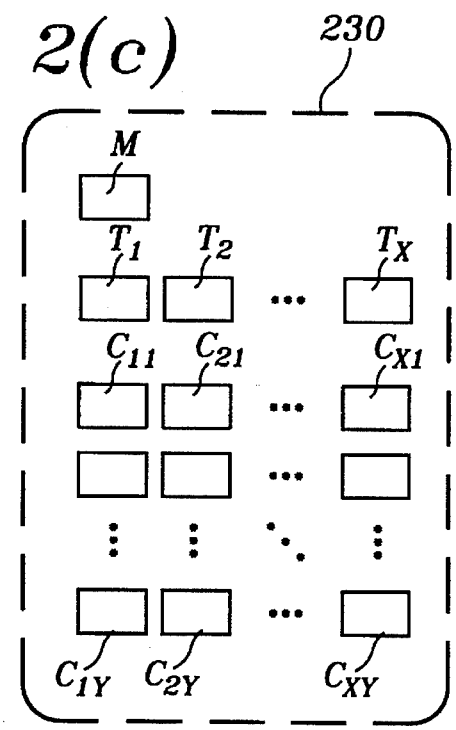

FIGS. 2(a), 2(b), and 2(c) schematically illustrate a second embodiment of the present invention. FIG. 2(a) shows an information storage medium 200 which has a storage area 210. The storage area 210 is divided into sections $S_1$ through $S_N$. A first group of the set of sections $S_1$ through $S_N$ stores the disk selection marker M and a digital contents information table 230 (FIG. 2(c)). The following sections S form the digital information area 220. The digital information area 220 contains data $D_1$ through $D_X$ which may be comprised of musical pieces, image information, text, binary data, map information, or the like (FIG. 2(b)).

The digital contents information table 230 contains a disk selection marker M, digital contents information $C_{11}$ through $C_{XY}$, and speech templates $T_1$ through $T_X$, which are related to the digital data $D_1$ through $D_X$ as shown in FIG. 2(c). The addressing pointers in the digital contents information $C_{11}$ through $C_{XY}$ are used to access the desired digital data $D_1$ through $D_X$. The disk selection marker M includes speech templates and/or title information used for selection of a specific disk in a multiple disk system.

When the information storage medium 200 shown in FIG. 2(a) is played back on an associated disk player to reproduce the digital contents information table 130, the disk selection marker M, speech templates $T_1$ through $T_X$, and the digital contents information $C_{11}$ through $C_{XY}$ relative to the digital data $D_1$ through $D_X$ contained in the digital information area 220 are reproduced. The template contained in the disk selection marker M and/or templates $T_1$ through $T_X$ contained in the digital contents information table 230 are extracted and used for comparison with human speech patterns to determine which disk is to be selected and which information on the disk is to be accessed.

For example, the digital contents information table 230 contains speech templates $T_1$ through $T_X$ which represent titles of music piece information stored as digital data $D_1$ through $D_X$ respectively in the information area 220. When the title of a music piece is spoken, the speech recognition processing unit of the disc player compares the spoken title to speech templates $T_1$ through $T_X$ stored on the optical disk and if the corresponding music piece $D_1$ through $D_X$ is found, the music piece will be selected by the disk player and played back.

Additionally, the digital contents information $C_{1j}$ through $C_{xj}$ may include response messages to indicate which music piece was selected. Response messages may consist of played prerecorded speech, electronically generated verbal announcements, and/or text or graphical data that can be shown on a system display. FIG. 2(c) depicts one version of the ordering of the digital contents information $C_{1j}$ through $C_{xj}$, speech templates $T_1$ through $T_x$, and the disk selection marker M; other orderings and/or combinations of these may also be used.

Because the digital contents information $C_{1j}$ through $C_{xj}$ is composed of digital data, the data can include text in any language which may be shown on a graphical display or the like. Also, because the digital contents information $C_{1j}$ through $C_{xj}$ is digital, it can contain prerecorded messages in any language which may be played out through an audio transducer such as an electronic speaker or the like. A list of music piece title choices representing music piece information stored as digital data $D_1$ through $D_x$ can be displayed and/or presented verbally through an electronic speaker in response to a spoken command such as "LIST CONTENTS." Therefore, the user can output and display text and/or have presented verbal representations of music piece titles from the information storage medium 200, and play back a desired music piece based on speaking a title from the displayed and/or verbally presented title representations listed.

Figure 3A:
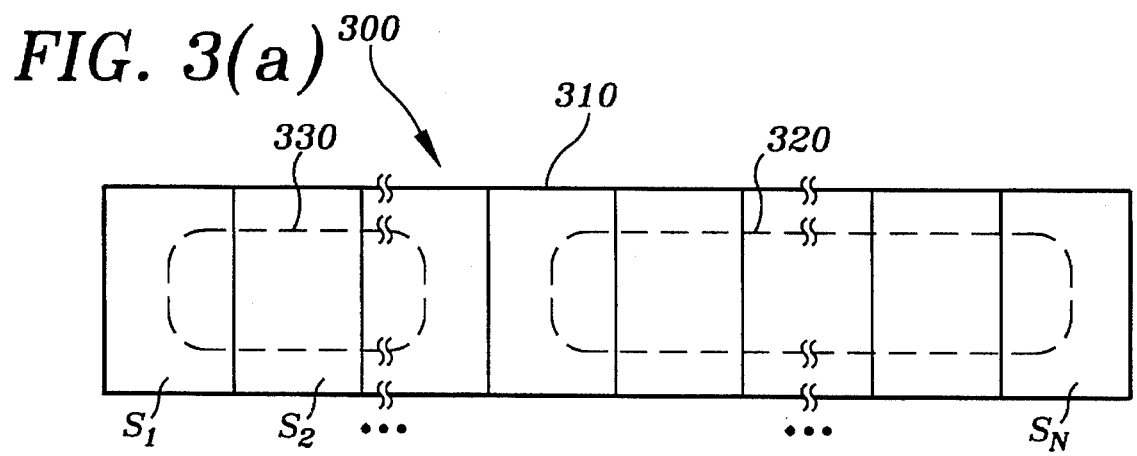
FIGS. 3(a) through 3(c) are diagrams illustrating a third embodiment of the present invention.
Figure 3B:
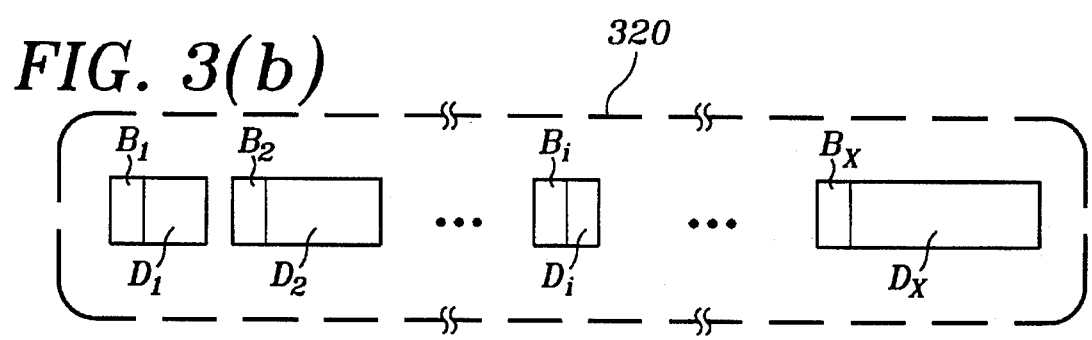
Figure 3C:
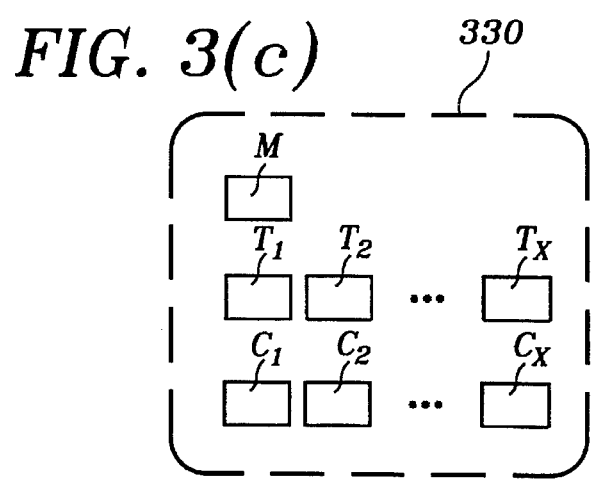
Figure 4:
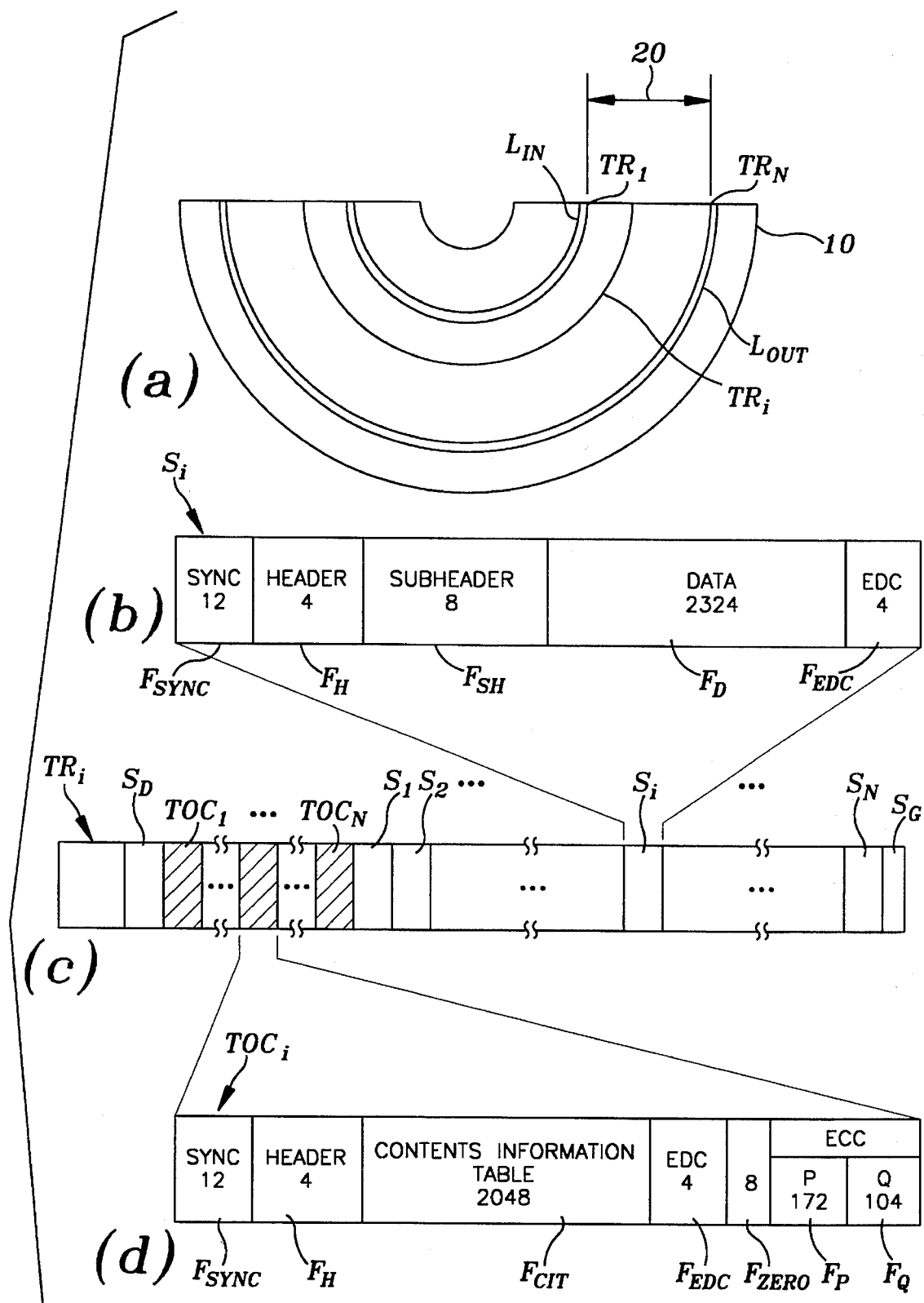
FIGS. 4(a) through (d) are diagrams illustrating a data structure of an information storage medium used in a fourth embodiment of the present invention.

FIGS. 3(a), 3(b), and 3(c) schematically illustrate a third embodiment of the present invention. FIG. 3(a) shows another information storage medium 300 which has a storage area 310. The storage area 310 is divided into sections $S_1$ through $S_N$. Section $S_1$ stores the disk selection marker M. Starting with $S_2$, each section contains both digital contents information in bins $B_1$ through $B_x$ and associated digital information $D_1$ through $D_x$ (FIG. 3(b)) The digital information $D_1$ through $D_x$ may be comprised of musical pieces, image information, text, binary data, map information, or the like, as shown in FIG. 3(b).

The digital contents information bins $B_1$ through $B_x$ are used to store address markers for retrieving the associated digital data $D_1$ through $D_x$. A digital contents information table 330 (FIG. 3(c)) contains the disk selection marker M, templates $T_1$ through $T_x$ corresponding to the respective data $D_1$ through $D_x$, and corresponding contents information $C_1$ through $C_x$ representing pointers to address markers and titles of the data $D_1$ through $D_x$ which is to be accessed. The disk selection marker M includes speech templates and/or title information used for selection of a specific disk in a multiple disk system. For example, if a user wishes to play all music pieces on a specific disk in a music CD-ROM playing system, the user would cause the CD-ROM playing system to play back music pieces contained on only that disk based on the disk selection marker M.

When the information storage medium 300 shown in FIG. 3(a) is played back on an associated disk player to reproduce the digital contents information table 330, the disk selection marker M, speech templates $T_1$ through $T_x$, and the digital contents information $C_1$ through $C_x$ relative to the digital data $D_1$ through $D_x$ contained in the digital information area 320 are reproduced. The template contained in the disk selection marker M and/or templates $T_1$ through $T_x$ contained in the digital contents information table 330 are extracted and used for comparison with human speech patterns to determine which disk is to be selected and which information on the disk is to be accessed.

For example, the digital contents information table 330 contains speech templates $T_1$ through $T_x$ which represent titles of music piece information stored as digital data $D_1$ through $D_x$ respectively in the information area 320. The addressing pointers in the digital contents information $C_1$ through $C_x$ are used to quickly access the desired music piece information stored as digital data $D_1$ through $D_x$. When the user selects a desired music piece $D_i$ by speaking its title, the speech recognition unit of the CD-ROM player compares the spoken title to the templates $T_1$ through $T_x$. When a matching speech template $T_i$ is found, the CD-ROM player reads the corresponding address in the digital contents information area $C_i$ and quickly scans the CD-ROM disk to access the music piece associated with the bin $B_i$ having the corresponding address. The selected music piece is then played back.

Additionally, the digital contents information $C_1$ through $C_x$ may include response messages to indicate which music piece was selected. Response messages may consist of played prerecorded speech, electronically generated verbal announcements, and/or text or graphical data that can be shown on a system display. FIG. 3(c) depicts one version of the ordering of the digital contents information $C_1$ through $C_x$, speech templates $T_1$ through $T_x$, and the disk selection marker M; other orderings and/or combinations of these may also be used.

Because the digital contents information $C_1$ through $C_x$ is composed of digital data, the data can include text in any language which may be shown on a graphical display or the like. Also, because the digital contents information $C_1$ through $C_x$ is digital, it can contain prerecorded messages in any language which may be played out through an audio transducer such as an electronic speaker or the like. A list of music piece title choices representing music piece information stored as digital data $D_1$ through $D_x$ can be displayed and/or presented verbally through an electronic speaker in response to a spoken command such as "LIST CONTENTS." Therefore, the user can output and display text and/or have presented verbal representations of music piece titles from the information storage medium 300, and play back a desired music piece based on speaking a title from the displayed and/or verbally presented title representations listed.

FIGS. 4(a) through 4(d) illustrate a data structure of an information medium used in a fourth embodiment of the present invention, the storage medium being in the form of a CD-ROMXA optical disk.

An optical disk such as a CD-ROM is an information storage medium that employs a compact disk also known as a "CD;" the read-only memory, hereinafter referred to as ROM, terminology originated from the fact that the data on the first CDs could only be read after the data was initially programmed. Since the standards for CD-ROMs were established in 1985, CD-ROMs have found wide spread use in a variety of applications and are advantageous in that they provide a very large data storage capacity at a low cost and are highly reliable.

Information storage mediums which employ a format based on the CD-ROM include CD-I and CD-ROMXA. The CD-I disks allow for interactive operation by the user. Both CD-I and CD-ROMXA mediums can record and reproduce music, picture, map, multimedia library information, or the like. To increase the amount of data which can be stored on a CD-ROM, digital compression and decompression techniques such as ADPCM may be employed.

The track and sector structure as well as the data format for a CD-ROMXA disk are shown in FIGS. 4(a) through 4(d). The data format described in FIGS. 4(a) through 4(d)

may be applied to a variety of digitally coded information such as music pieces, pictures, maps, multimedia library information, or the like.

For example, the data field $F_D$ may contain music piece information for play back on a music CD-ROM player. According to the CD-ROM signal format used to store music piece information, 98 frames of subcodes are handled as one sector. One sector corresponds to 1/75 second. The sample rate for the CD-ROM is 44.1 kHz; therefore, $$44.1 \times 10^3 \times 16 \times 2 \times 1/75 \times 1/8 = 2352; \quad (1)$$

data represented by 2352 bytes can be stored in one sector on a CD-ROM. In the preceding equation (1), $44.1 \times 10^3$ indicates the sampling frequency of 44.1 kHz, 16 indicates the quantization factor, 2 indicates the number of channels, 1/75 indicates that 75 sectors per second can be read, and 1/8 indicates 8 bits per byte.

On a CD-ROMXA disk as used in this example, data is recorded on each sector. There are two standards for stored data on CD-ROMXA disks depending on the size of the data area. These standards are Mode 1 and Mode 2. Additionally, Mode 2 has two standards which are designated as Form 1 and Form 2.

As illustrated in FIG. 4(a), the CD-ROMXA disk 10 has lead-in tracks $L_{IN}$, a storage area 20 further comprising tracks $TR_1$ through $TR_N$, and lead-out tracks $L_{OUT}$. In the storage area 20, each track $TR_i$ contains a volume descriptor $S_D$, sectors $TOC_1$ through $TOC_N$, sectors $S_1$ through $S_N$, and a gap $S_G$. The volume descriptor $T_D$ is an area for storing an identification code to indicate that the disk is a CD-ROMXA type, a flag, a startup directory, etc., and is recorded in either Mode 1 or Mode 2 Form 1.

The sectors $S_1$ through $S_N$ store information including music pieces, pictures, maps, multimedia information, or the like. For this example, sectors $S_1$ through SN store music piece information which is recorded in Mode 2 Form 2. Each sector $S_i$ (FIG. 4(b)) contains a synchronization field $F_{SYNC}$ containing 12 bytes, a header $F_H$ containing 4 bytes, a subheader $F_{SH}$ containing 8 bytes, a data field $F_D$ storing the music piece information and containing 2324 bytes, and an error detecting code $F_{EDC}$ containing 4 bytes. For each sector $S_i$, 2324 bytes of music piece information can be stored. This value is arrived at from the equation (2):

$$2352 - (12 + 4 + 8 + 4) = 2324; \quad (2)$$

where 2352 is the total number of bytes which can be stored in one sector, 12 indicates the number of bytes in the synchronization field $F_{SYNC}$, 4 indicates the number of bytes in the sector header $F_H$, 8 indicates the number of bytes in the subheader $FS_H$, and 4 indicates the number of bytes in the error detecting code field $F_{EDC}$. Methods of coding music piece information or the like such as by using ADPCM are known in the art and are used to store such information as data in 2324 bytes per sector.

A disk table of contents is contained in sectors $TOC_1$ through $TOC_N$. The sectors $TOC_1$ through $TOG_N$ correspond to the digital contents information table stored in the data field $F_{CIT}$. The digital contents information table which includes speech recognition templates is stored in a sector $TOC_i$ which, as shown in FIG. 4(c), comprises one or more sectors $TOC_1$ through $TOC_N$ following the volume descriptor $S_D$. In this example, the disk table of contents in sectors $TOC_1$ through $TOC_N$ is stored in Mode 1, but may alternatively be stored in Mode 2 Form 1. More specifically, the digital contents information table is comprised of one or more sectors such that if one sector is used, then the available capacity for storing the contents information table is 2048 bytes as shown in FIG. 4(d). If N sectors are used, then the available storage capacity is N×2048 bytes. In Mode 1, each sector $TOC_i$ has no subheader and instead contains a reserved 8 byte null or zero field $F_{ZERO}$. The error correction field ECC is composed of a P parity field $F_P$ having 172 bytes and a Q parity field $F_Q$ having 104 bytes for a combined total of 276 bytes.

Figure 5:
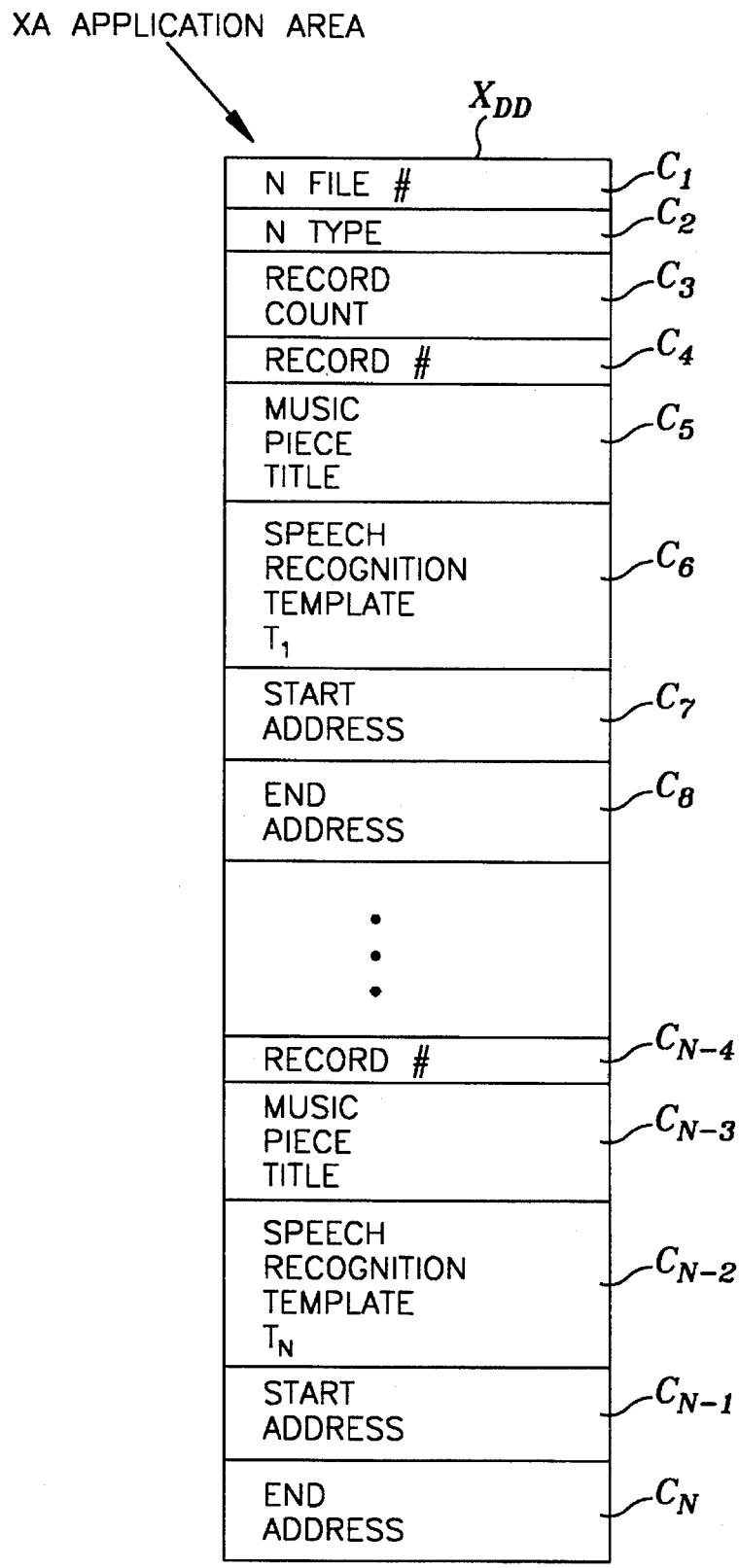
FIG. 5 is a diagram illustrating a data structure of a digital contents information table employing speech recognition templates.

FIG. 5 illustrates an example of the digital contents information $C_1$ through $C_N$ including speech recognition templates $T_1$ through $T_N$ contained in the digital contents information table $X_{DD}$. The XA application area of the CD-ROMXA disk includes data comprising the digital contents information table $X_{DD}$. The digital contents information table $X_{DD}$ is formed by concatenating consecutive digital contents information data fields $F_{CIT}$ in the table of contents sectors $TOC_1$ through $TOC_N$ shown in FIG. 4. When a compatible CD-ROM player, as defined in the volume descriptor $S_D$, is used with the CD-ROMXA disk containing speech recognition templates, a music piece can be played back in response to a user speaking the title of the music piece. The spoken input from the user is compared to speech recognition templates $T_1$ through $T_N$ contained in the digital contents information table $X_{DD}$ by the speech recognition unit in the compatible CD-ROM disk player. The speech recognition unit then signals the CD-ROM system processor to access the music piece information at the corresponding address on the CD-ROM disk. The CD-ROM disk player then plays back the selected music piece.

A CD-ROMXA disk has been employed as the information storage medium in the above described embodiment; however, the storage medium may be any of various types of insertable storage mediums including, but not limited to, CD-ROM disks, CD-I disks, ordinary CDs, DAT tapes, miniature CD-ROM disks, IC cartridges such as insertable ROM cartridges, PCMCIA cards, and the like.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. An information storage medium comprising:

an optical disk;

a storage area including a plurality of sections on said optical disk;

ones of said plurality of said sections storing an information table;

other ones of said plurality of said sections storing prestored data; and said information table including speech recognition templates and pointers identifying data locations within said sections storing prestored data, such that said pointers are accessed by user spoken identifiers associated with the data and recognized by said speech recognition templates for retrieving data stored on said sections storing prestored data for output to a user based upon said user spoken identifiers.

2. The storage medium of claim 1 wherein said data locations store musical songs and said pointers are accessed by spoken song titles.

3. The storage medium of claim 2 wherein said speech recognition templates represent song titles.

4. The storage medium of claim 2 wherein said speech recognition templates represent a title for each of said storage areas, and said pointers access a storage area.

5. The storage medium of claim 1 wherein said data locations store video information and said pointers are accessed by spoken titles.

6. The storage medium of claim 1 wherein said information table further includes stored output messages corresponding to data stored in said speech recognition templates and which are accessed by said pointers.

7. An information storage medium comprising:

an optical disk;

a plurality of storage areas, each storage area including a plurality of sections on said optical disk;

ones of said plurality of said sections storing an information table;

other ones of said plurality of said sections storing prestored data; and said information table including speech recognition templates and pointers identifying storage areas, such that said pointers are accessed by user spoken identifiers associated with the data and recognized by said speech recognition templates for retrieving data stored on said sections storing prestored data for output to a user based upon said user spoken identifiers.

8. The storage medium of claim 7 wherein said data locations store musical songs and said pointers are accessed by spoken song titles.

9. The storage medium of claim 8 wherein said speech recognition templates represent song titles.

10. The storage medium of claim 8 wherein said speech recognition templates represent a title for each of said storage areas, and said pointers access a storage area.

11. The storage medium of claim 7 wherein said data locations store video information and said pointers are accessed by spoken titles.

12. The storage medium of claim 7 wherein said information table further includes stored output messages corresponding to data stored in said speech recognition templates and which are accessed by said pointers.

* * * * *